April 26, 1955 C. L. SNYDER 2,707,226
VAPORIZER
Filed March 21, 1952
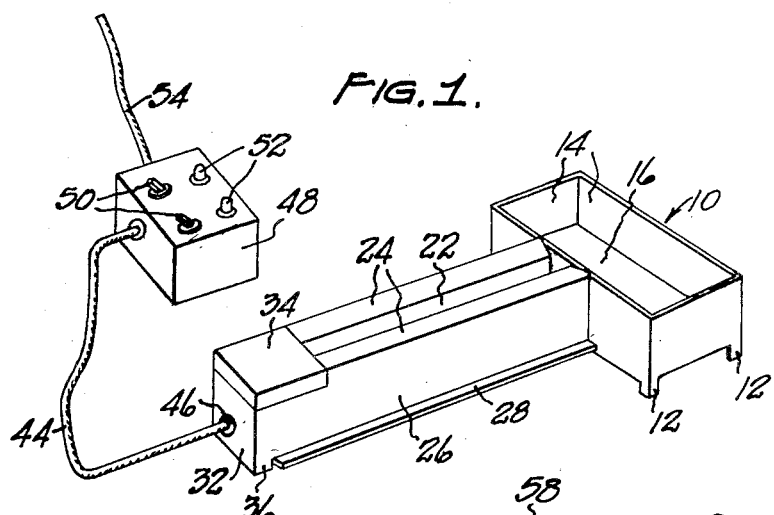
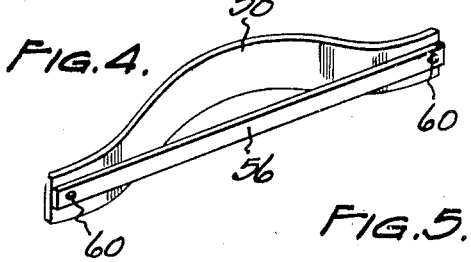
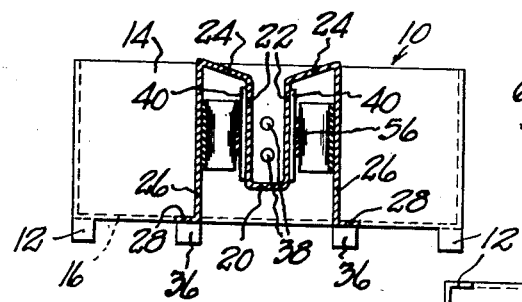
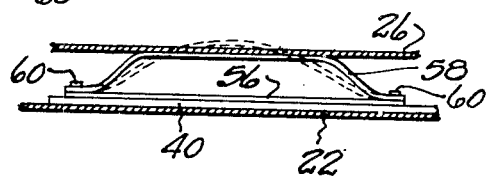
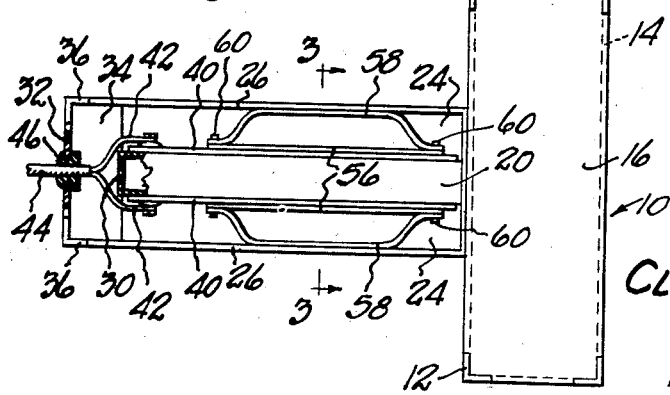
CLOYD L. SNYDER.
INVENTOR.
BY Oltsch & Knoblock
ATTORNEYS.

United States Patent Office 2,707,226
Patented Apr. 26, 1955

2,707,226

VAPORIZER

Cloyd L. Snyder, Plymouth, Ind.

Application March 21, 1952, Serial No. 277,793

1 Claim. (Cl. 219—44)

This invention relates to improvements in vaporizers. More particularly the invention relates to a device adapted to be used in steam bath cabinets for generating steam within the cabinet for therapeutic treatments.

The primary object of this invention is to provide a device of this character having a vaporizer chamber communicating with a storage chamber, which vaporizing chamber is characterized by small size, a large surface area to accommodate rapid heating of the contents of the storage chamber by heat applied to the walls thereof, and a substantial depth to avoid great fluctuations of the contents of the vaporizing chamber.

A further object is to provide a device of this character with removable heating elements located in a protected position and detachable readily without requiring the use or manipulation of securing means.

A further object is to provide a vaporizer with novel means for securing a heating element in place by the use of a spring structure so constructed as to insure effective heat transfer between the heating element and a container surface against which the heating element is pressed by the spring structure.

A further object is to provide a simple, inexpensive, efficient vaporizer utilizing an electric heating element.

Other objects will be apparent from the following specification.

In the drawing:

Fig. 1 is a perspective view illustrating one embodiment of the invention.

Fig. 2 is a bottom plan view of the device.

Fig. 3 is a transverse sectional view of the device taken on line 3—3 of Fig. 2.

Fig. 4 is a perspective view of a spring structure used in the device.

Fig. 5 is an edge view of the spring structure illustrating the manner in which it is used.

Referring to the drawing which illustrates the preferred embodiment of the invention, the numeral 10 designates a storage container which may be of any desired size and shape and which is here shown as being provided with leg portions 12 for positioning the same at an elevation. These leg portions 12 are preferably located at the corners of the container as illustrated, and may be formed integrally with the container as by being cut out from the metal of which the side walls of the container are formed. The container will be provided with the usual vertical walls 14 and bottom 16, and may be round or square or of any other shape found desirable instead of being of rectangular shape as illustrated.

Connected to the storage chamber is a vaporizing chamber which is preferably formed by a structure which is substantially M-shape in cross-section, as illustrated in Fig. 3. Thus, as illustrated, the vaporizing chamber may have a bottom portion 20 and side walls 22 located substantially vertically and spaced apart a distance less than their depth. The walls 22 and bottom 20 will preferably be elongated so that the length thereof will be substantially greater than the width and depth thereof. From the upper ends of the side walls 22 will preferably project lateral walls 24 which preferably incline upwardly and outwardly as shown, with their outer ends terminating at or adjacent the level of the top edges of the side walls of the storage chamber 10. From the outer ends of the top walls 24 depend outer walls 26 which preferably are vertical and substantially parallel to the walls 22.

The structure preferably will be reinforced by flanges 28 extending longitudinally from the bottom margin of the walls 26. The outer side walls 26 will preferably be of a length greater than the inner walls 22, and an end wall 30 will connect said walls 22, as best seen in Fig. 2. The outer ends of the outer walls 26 will preferably be connected by a transverse wall 32 which is spaced from the end wall 30 of the vaporizing chamber. If desired, a cover plate 34 may be mounted detachably upon the upper outer end of the vaporizer structure, as best seen in Fig. 1.

For the purpose of stability legs 36 may depend from the outer ends of the side walls 26 to support the container. It will be understood that the forward ends of each of the walls 22, 24 and 26 of the vaporizer structure will be welded, soldered or otherwise secured to one of the side walls 14 of the main storage chamber so that said storage wall forms an end wall of the vaporizer chamber opposite the end wall 30. Said storage chamber wall will preferably have apertures 38 formed therein positioned intermediate the height of the walls 14 of the storage chamber and spaced above the level of the bottom 20 of the vaporizing chamber. The openings 38 will normally provide communication between the storage chamber and the vaporizing chamber and will insure that the liquid level of the two chambers remains constant. In this connection it will be understood that the capacity of the storage chamber will usually be large compared to the capacity of the vaporizing chamber so that the storage chamber will have a capacity sufficient for one bath and the capacity of the vaporizing chamber at any time is only a small fraction of the capacity of the storage chamber. In this way, as vaporization occurs in the vaporizing chamber, the same is replenished and it is not necessary that all of the water to be used in the device be heated simultaneously.

Electric heating elements 40 are employed in the device. These elements are preferably flat units, externally insulated, and with heating elements or resistance wires imbedded therein. The external insulation of these units permits them to be placed directly in contact with a metal member to be heated, and, in the preferred embodiment of the invention as here illustrated, said heating elements 40 are positioned in contact with the outer faces of the walls 22 of the vaporizing chamber. The size of the heating element 40 is preferably such as to provide contact with the major portion of the area of said side walls so as to effect a heat transfer through or at the major portion of the area of said walls.

The heating elements 40 are connected with electric leads 42 extending to and forming a part of a flexible lead-in or insulated conductor or cable 44. The leads 42 are preferably individually insulated and extend around the end wall 30 of the vaporizing chamber to merge in the conductor 44. The end wall 32 of the unit has an opening therein which preferably receives a bushing 46 through which the conductor 44 passes. The conductor 44 leads to a control unit 48 which may have one or more manually actuable controls 50 for regulating the amount of current supplied to the heating elements. The controller may also be provided with signal means, such as the electric lamps 52, associated with the respective switches 50 to indicate when said switches are in the "on" position. The switches 50 will preferably be provided to individually control the heating elements 40. This is not essential, however, and the two heating elements 40 may be controlled by the same switch. A conductor 54 connects the controller 48 to the line.

The heating elements are applied in place by means of the spring units best illustrated in Figs. 4 and 5. This spring unit includes two elongated bands 56 and 58 which are secured together at their opposite ends at 60. The member 58 is of greater length than the member 56 and is formed of spring steel. The connection of the ends at 60 is so effected to the respective ends of the members 56 and 58 that the member 56 holds the member 58 in a bowed shape or form, as illustrated in Fig. 4, due to the fact that its length is greater than the length of the band 58. Stated differently, the spacing of the securing members 60 of the spring band 58 is greater than the spacing between the securing members on the bands 56. The arrangement is such that the extent of the bow, that is, the maximum spacing between the bands 56 and 58 at their centers, will be greater than the spacing between a heating element 40 and the adjacent wall 26 of the vaporizing unit. Consequently, when the heating element is inserted in place and the spring unit 56, 58 is installed in place, it is necessary to deform the spring 58 from the condition shown in Fig. 4 and in dotted lines in Fig. 5 to the condition shown in full lines in Fig. 5. This insures that a substantial portion of the spring 58 bears flat against the wall, such as the wall 26, and affords a large area of friction contact. The combination of this friction contact or engagement, together with the pressure of the spring and the large area of friction contact of the heating element with the chamber wall, insures that the heating element will be held in desired position. This arrangement eliminates all need for fasteners or usual securing means and facilitates the rapid installation and removal of the heating elements to and from the device.

The device may be mounted in a steam bath cabinet in any manner found suitable. Usually it will be mounted in the bottom portion of the cabinet, as below the seat therein or below a reticulated floor board. The device will preferably be removably mounted although it may be secured in place fixedly. Removable mounting of the device is preferred to facilitate access for repair.

The device has a number of advantages over previous devices. One advantage of the device is its vertical elongation, that is, it is deep but narrow. This provides side walls of large area to insure rapid heat transfer. At the same time it simplifies the matter of maintaining a substantially uniform water level. Thus, where the storage capacity of the elongated narrow but deep vaporizing chamber is small compared to that of the storage chamber with which it communicates, the evaporation of liquid therein will not entail great changes in the water level. The communication of the two chambers insures that the same water level will exist in both chambers, and fluctuations in water level in the vaporizing chamber will be very gradual and will occur only as the water level in the storage chamber lowers.

Another important advantage of the device is the manner in which the heating elements are protected against contact with the water. The heating elements are positively guarded against any contact of water therewith, as by splashing of water during filling. Observe in this connection that as the container is being filled, the side walls 26 and the top walls 24 serve to protect the heating elements from the water which might accidentally splash during filling of the device. In other words, the heating elements are almost completely hooded and, in the preferred embodiment, the walls 26 will project to a level at or below the level of the heating elements to enhance this protection. This protection, however, does not interfere with the removability of the heating elements or reduce their accessibility.

Another substantial advantage is the spring structure which mounts the heating elements in place. This spring structure accommodates itself automatically to the shape and contour of the heating elements and the parts in which it fits. While the use of similar heating elements is desirable, it is not essential because of the above described adaptability of the spring unit to the shape of the parts which it engages.

If desired, holders of medicaments (not shown) may be associated with the device, preferably supported above the vaporizing chamber, so that medicated vapors will be generated by the device.

While the preferred embodiment of the invention has been illustrated and described, it will be understood that changes in the construction may be made within the scope of the appended claim without departing from the spirit of the invention.

I claim:

A vaporizer comprising a liquid container having upright walls, a storage container secured to said first container and having openings communicating with said first container, a pair of insulated electric heating elements, and means positioning said elements in contact with the outer surfaces of opposite upright walls of said first container, said first container including outwardly upwardly inclined walls terminating in depending abutment portions spaced outwardly from said upright walls, said positioning means constituting an elongated leaf spring and non-extensible means fixedly connected to the ends of said leaf spring, the maximum lateral dimension of said positioning means being greater than the spacing between each heating element and the adjacent abutment portion.

References Cited in the file of this patent

UNITED STATES PATENTS

| | | |
|---|---|---|
| 1,702,089 | Rohne | Feb. 12, 1929 |
| 2,089,712 | Rowe | Aug. 10, 1937 |
| 2,244,180 | Williams et al. | June 3, 1941 |
| 2,282,441 | Whitlock | May 12, 1942 |
| 2,379,034 | Pargman | June 26, 1945 |
| 2,460,625 | Ellis | Feb. 1, 1949 |